United States Patent
Puetz et al.

(10) Patent No.: US 6,201,919 B1
(45) Date of Patent: Mar. 13, 2001

(54) FIBER DISTRIBUTION FRAME

(75) Inventors: Curtis Lee Puetz, Apple Valley; Gary E. Dusterhoft, Eden Prairie, both of MN (US)

(73) Assignee: ADC Telecommunications, Inc, Minnetonka, MN (US)

( * ) Notice: Subject to any disclaimer, the term of this patent is extended or adjusted under 35 U.S.C. 154(b) by 0 days.

(21) Appl. No.: 09/213,036

(22) Filed: Dec. 16, 1998

(51) Int. Cl.$^7$ ........................................................ G02B 6/00
(52) U.S. Cl. ................................................ 385/134; 385/135
(58) Field of Search ....................................... 385/134, 135, 385/136, 137, 139, 147, 59, 53, 89

(56) References Cited

U.S. PATENT DOCUMENTS

| | | |
|---|---|---|
| 4,359,262 | 11/1982 | Dolan . |
| 4,502,754 | 3/1985 | Kawa . |
| 4,585,303 | 4/1986 | Pinsard et al. . |
| 4,595,255 | 6/1986 | Bhatt et al. . |
| 4,630,886 | 12/1986 | Lauriello et al. . |
| 4,699,455 | 10/1987 | Erbe et al. . |
| 4,717,231 | 1/1988 | Dewez et al. . |
| 4,765,710 | 8/1988 | Burmeister et al. . |
| 4,776,662 | 10/1988 | Valleix . |
| 4,792,203 | 12/1988 | Nelson et al. . |
| 4,824,196 | 4/1989 | Bylander . |
| 4,900,123 | 2/1990 | Barlow et al. . |
| 4,986,762 | 1/1991 | Keith . |
| 4,995,688 | 2/1991 | Anton et al. . |
| 5,100,221 | * 3/1992 | Carney et al. . |

(List continued on next page.)

FOREIGN PATENT DOCUMENTS

| | | |
|---|---|---|
| 40995/85 | 10/1985 | (AU) . |
| 8655314 A1 | 10/1986 | (AU) . |
| 27 35 106 | * 8/1977 | (DE) . |
| 3308682 | * 9/1984 | (DE) . |
| 146478 | 12/1984 | (EP) . |
| 149250 | 12/1984 | (EP) . |
| 196102 A2 | 3/1986 | (EP) . |
| 406151 A2 | 5/1990 | (EP) . |
| 479226 | * 4/1992 | (EP) . |
| 196102 B1 | 3/1993 | (EP) . |
| 538164 A1 | * 4/1993 | (EP) . |
| 2531576 | * 2/1984 | (FR) . |
| 59-74523 | * 4/1984 | (JP) . |
| 60-169811 | * 9/1985 | (JP) . |
| 61-55607 | * 3/1986 | (JP) . |
| 61-90104 | * 5/1986 | (JP) . |

*Primary Examiner*—Frank G. Font
*Assistant Examiner*—Sang H. Nguyen
(74) *Attorney, Agent, or Firm*—Merchant & Gould P.C.

(57) ABSTRACT

A fiber distribution frame includes a support structure having a wall with a plurality of bulkhead assemblies secured to the wall. Each of the assemblies has opposing and spaced-apart slide plates. A connector support rod is positioned between the slide plates. The rod is slidably connected to each of the slide plates for the rod to slide along a linear and horizontal path of travel extending substantially perpendicular to the wall. The rod is slidable between a retracted position and an extended position. In the retracted position, a rear end of the rod is positioned adjacent the wall. In the extended position, the rear end of the rod is positioned adjacent a forward edge of the slide plates. The rod carries a plurality of fiberoptic adaptors. Each of the adaptors may receive an individual coupled pair of fiberoptic connectors. The plurality of adaptors are disposed on the rod in a linear array extending along the path of travel. The adaptors are aligned for coupled connectors to extend transversely away from the path of travel on opposite sides of the rod. Snap clips are provided to mount each plate to the support structure. Each plate is further constructed from separate halves and includes a dove-tail arrangement between each plate and the rod. A stop limits the rod from sliding beyond the extended position. A flexible tab engages the stop, and also permits insertion and removal of each rod from the assemblies.

23 Claims, 14 Drawing Sheets

U.S. PATENT DOCUMENTS

| | | |
|---|---|---|
| 5,129,030 * | 7/1992 | Petrunia . |
| 5,142,606 * | 8/1992 | Carney et al. . |
| 5,167,001 * | 11/1992 | Debortoli et al. . |
| 5,317,663 * | 5/1994 | Beard et al. . |
| 5,353,367 * | 10/1994 | Czosnowski et al. . |
| 5,402,515 * | 3/1995 | Vidacovich et al. . |
| 5,490,229 * | 2/1996 | Ghandeharizadeh et al. . |
| 5,497,444 * | 3/1996 | Wheeler . |
| 5,758,003 * | 5/1998 | Wheeler et al. . |

* cited by examiner

FIBER DISTRIBUTION FRAME

I. BACKGROUND OF THE INVENTION

1. Field of the Invention

This invention pertains to the telecommunications industry. More particularly, this invention pertains to a high-density fiber distribution frame for use in the telecommunications industry.

2. Description of the Prior Art

In the telecommunications industry, the use of fiberoptic cables for carrying transmission signals is rapidly growing. To interconnect fiberoptic equipment, fiber distribution frames have been developed. An example of a prior art fiber distribution frame is shown in commonly assigned U.S. Pat. No. 4,995,688.

With the increase in the use of fiberoptic cables in the telecommunications industry, it has become desirable to provide fiberoptic distribution frames with increased density. By density, it is meant the number of locations per unit volume or unit area for providing connection on the fiber distribution frame.

Commonly assigned U.S. Pat. No. 5,758,003 teaches a high density fiber distribution frame for increasing the density of fiber connector locations on a frame. The '444 patent teaches a plurality of assemblies each containing a plurality of side-by-side linear arrays of fiberoptic adaptors. Each of the linear arrays moves independent of other arrays in a linear path of travel parallel to the longitudinal axis of the linear array. As a result, access to a particular adaptor can be achieved by moving only a small number of adaptors a small distance. Therefore, the probability of damage or undue displacement or bending of a fiberoptic cable is avoided in a high density application.

Commonly assigned U.S. Pat. No. 5,758,003 teaches a fiber management system for a high density fiber distribution frame having adaptor assemblies such as those shown in the '444 patent. The management system of the '003 patent mounts assemblies of the sliding adaptor arrays of the '444 patent in two vertical arrays on opposite sides of a fiber distribution frame. The assemblies of the arrays are spaced apart to provide a gap between adjacent assemblies of an array. A plurality of troughs extend between the gaps of the arrays to provide organized routing of fiberoptic cables between the assemblies.

While high density fiber distribution frames such as those disclosed in the '444 patent and the '003 patent have greatly enhanced the density, performance and fiber management of high density fiber distribution frames, from time to time it is desirable to provide a fiber distribution frame which is susceptible of low cost manufacture and ease of installation and use. It is an object of the present invention to provide a high density fiber distribution frame which meets such criteria.

II. SUMMARY OF THE INVENTION

According to a preferred embodiment of the present invention, a fiber distribution frame is disclosed which includes a support structure having a wall with a vertical forward face. A plurality of bulkhead assemblies are secured to the wall. Each of the assemblies has opposing and spaced-apart slide plates which are secured to the wall. The slide plates extend substantially perpendicular to the front face from a rear edge of the slide plates adjacent the forward face of the support structure to a forward edge of the slide plates spaced from the forward face of the support structure.

A connector support rod is positioned between the slide plates. The rod is slidably connected to each of the slide plates for the rod to slide along a linear and horizontal path of travel extending substantially perpendicular to the forward face. The rod is slidable between a retracted position and an extended position. In the retracted position, a rear end of the rod is positioned adjacent the forward face. In the extended position, the rear end of the rod is positioned adjacent the forward edge of the slide plates. The rod carries a plurality of fiberoptic adaptors. Each of the adaptors may receive an individual coupled pair of fiberoptic connectors. A plurality of adaptors are disposed on the rod in a linear array extending along the path of travel. The adaptors are aligned for coupled connectors to extend transversely away from the path of travel on opposite sides of the rod.

Each plate preferably snaps and is held by at least one fastener to the support structure. Each plate is further constructed from separate halves in the preferred embodiment. Each plate includes a dove tail arrangement between each plate and the rod, wherein each plate has a rod positioned on either side. A stop limits the rod from sliding beyond the extended position. The stop may be mounted on a flexible tab.

III. BRIEF DESCRIPTION OF THE DRAWINGS

FIG. 14 is a rear elevation view of two slide plates, each slide plate made from the slide plate segment of FIG. 13, and including the rod of FIG. 12 positioned there between.

IV. DETAILED DESCRIPTION OF THE PREFERRED EMBODIMENT

Referring now to the several drawing figures in which identical elements are numbered identically throughout, a description of a preferred embodiment of the present invention will now be provided.

Figure 1:
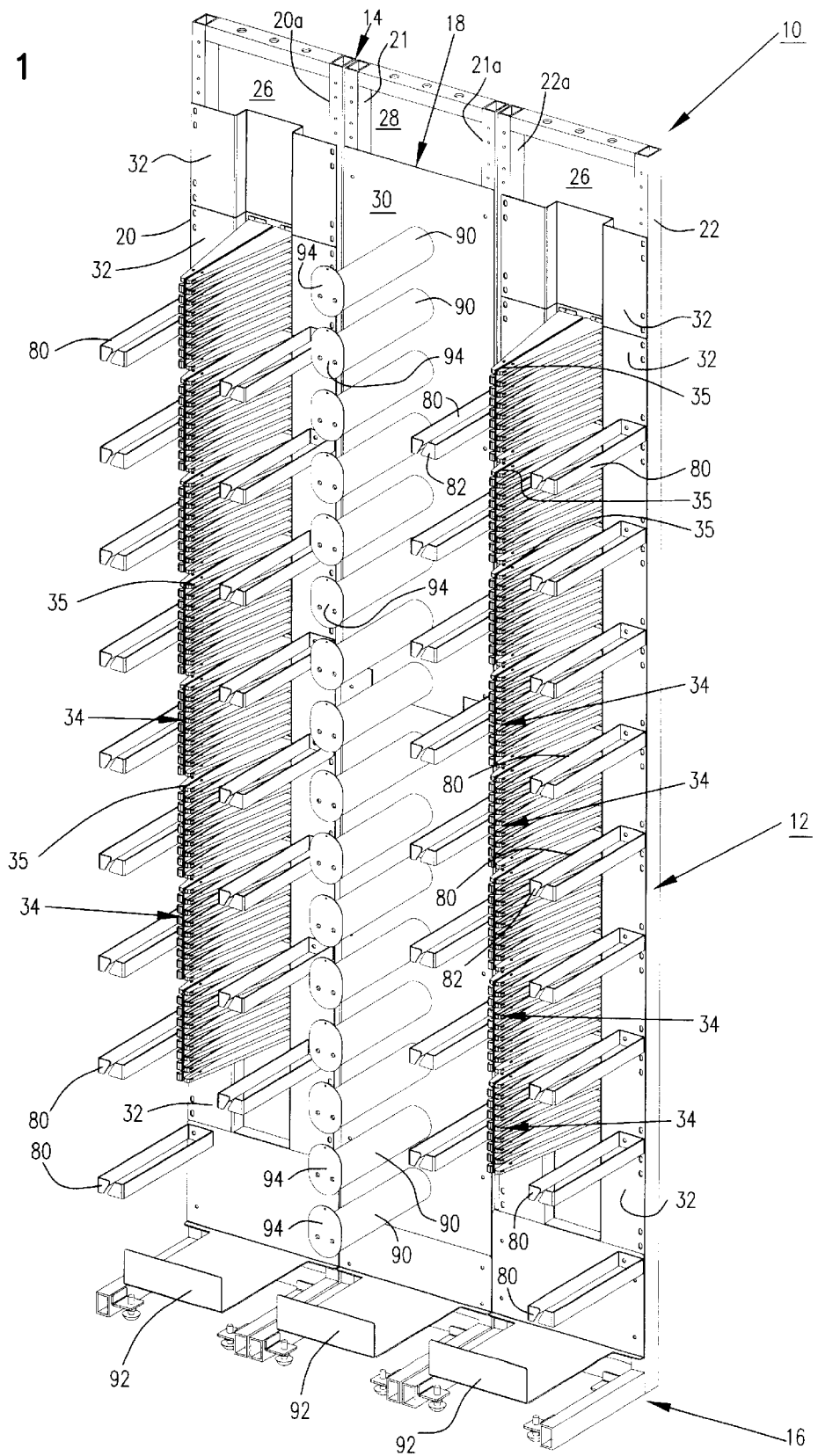
FIG. 1 is a front, top and left side perspective view of a fiber distribution frame according to the present invention.

With initial reference to FIG. 1, a fiber distribution frame 10 is shown. The frame 10 includes a support structure 12 having an upper edge 14 and a lower base portion 16. A support wall 18 extends vertically between the lower base portion 16 and upper edge 14. The support wall 18 also extends transversely between opposite side beams 20, 22. The support structure 12 includes a plurality of vertical support beams 20–22, 20a–22a which are spaced apart to define three vertical cavities. The vertical cavities include side cavities 26 and a central cavity 28 (shown only in FIG. 1).

The support wall 18 includes a plurality of plate segments including a sheet plate segment 30 secured to the beams 21, 21a defining the center cavity 28 such that the sheet segment 30 is a flat sheet covering the cavity 28. In the view of FIG. 1, an upper portion of the sheet 30 is removed to expose the center cavity 28 for purposes of illustration.

Figure 4:
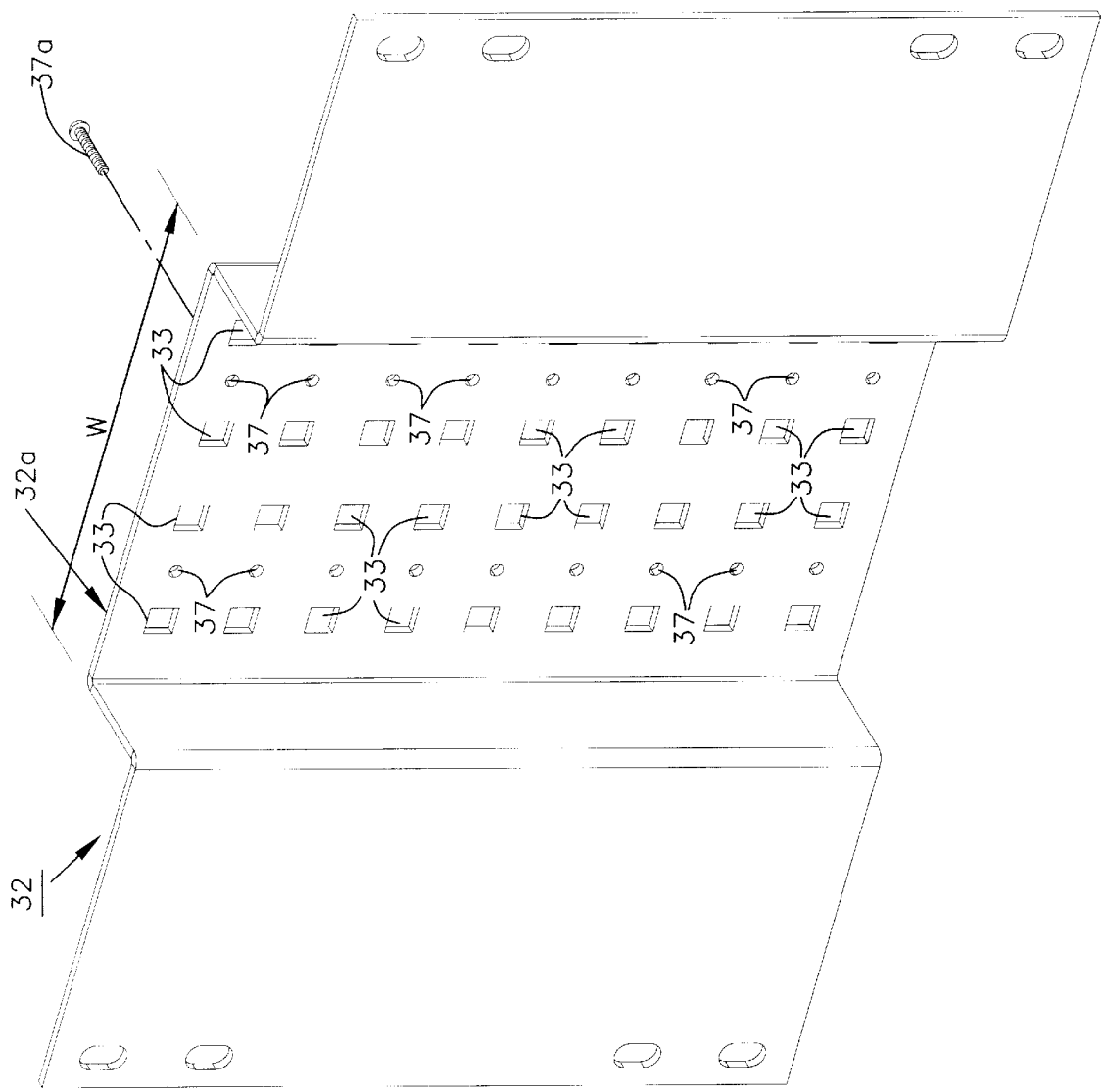
FIG. 4 is a perspective view of a support wall segment of the frame of FIG. 1.

The wall 18 also includes side wall segments 32 (shown separately in FIG. 4). The wall segments 32 cover the side cavities 26 and are secured to the support beams 20, 20a and 22, 22a defining the side cavities 26. In the view of FIG. 1, uppermost wall segments 32 are removed to expose the side cavities 26 for purposes of illustration.

The side wall segments 32 are substantially flat sheets of steel with a central trough 32a (FIG. 4) having a width W equal to a width of slide plates 36 as will be described. As shown only in FIG. 4, the recessed portion 32a includes a column of a plurality of horizontally aligned square openings 33 for purposes that will be described. Aligned with square holes 33, a plurality of holes 37 are formed through the wall 32a again, for purposes of that will be described.

A plurality of bulkhead assemblies 34 are secured to the wall 18 with the assemblies 34 positioned within the recess 32a. The bulkhead assemblies 34 are best illustrated with references to FIGS. 5 and 6.

The bulkhead assemblies 34 include two identical, generally flat and triangular shaped slide plates 36. The slide plates 36 have a rear edge 38 at the base of the triangular shape of the plate 36. At the triangular apex of the plate 36, the plate 36 has a narrow forward edge 40.

Extending perpendicular to the rear edge 38 and centrally along the entire length of the plate 36 to the center of the forward edge 40 is a dove-tail groove 42 on both sides of the plate 36. The groove 42 defines a longitudinal axis of the plate 36 with the plate 36 being symmetrical about the longitudinal axis. In the assembly 34 of FIGS. 5 and 6, the two plates 36 include an upper plate and a lower plate (both designated 36 due to their identical structure) with the upper and lower plates 36 being positioned with the dove-tail grooves 42 being vertically aligned and with the plates 36 being evenly spaced apart and parallel.

A slide rod 44 is positioned between the slide plates 36. The slide rod 44 has a length approximate to the axial length of the plates 36. The slide rod 44 includes a vertical central rib 46. The rod 44 also includes spaced-apart, horizontal and parallel end plates 48 secured to the vertical rib 46. The end plates 48 and central rib 46 present an I-beam construction. The central rib 46 is provided with a plurality of linearly aligned holes 58 the purpose of which will be described.

On outer sides of the end plates 48, dove-tail rails 50 are provided extending the axial length of the rod 44. The dove-tail rails 50 are sized to be slidably received within and complementarily shaped to the dove-tail grooves 42. The dove-tail rails 50 prevent separation in the vertical dimension from plates 36. Other shapes which prevent separation are possible, such as a rounded knob or a rectangle.

Figure 10:
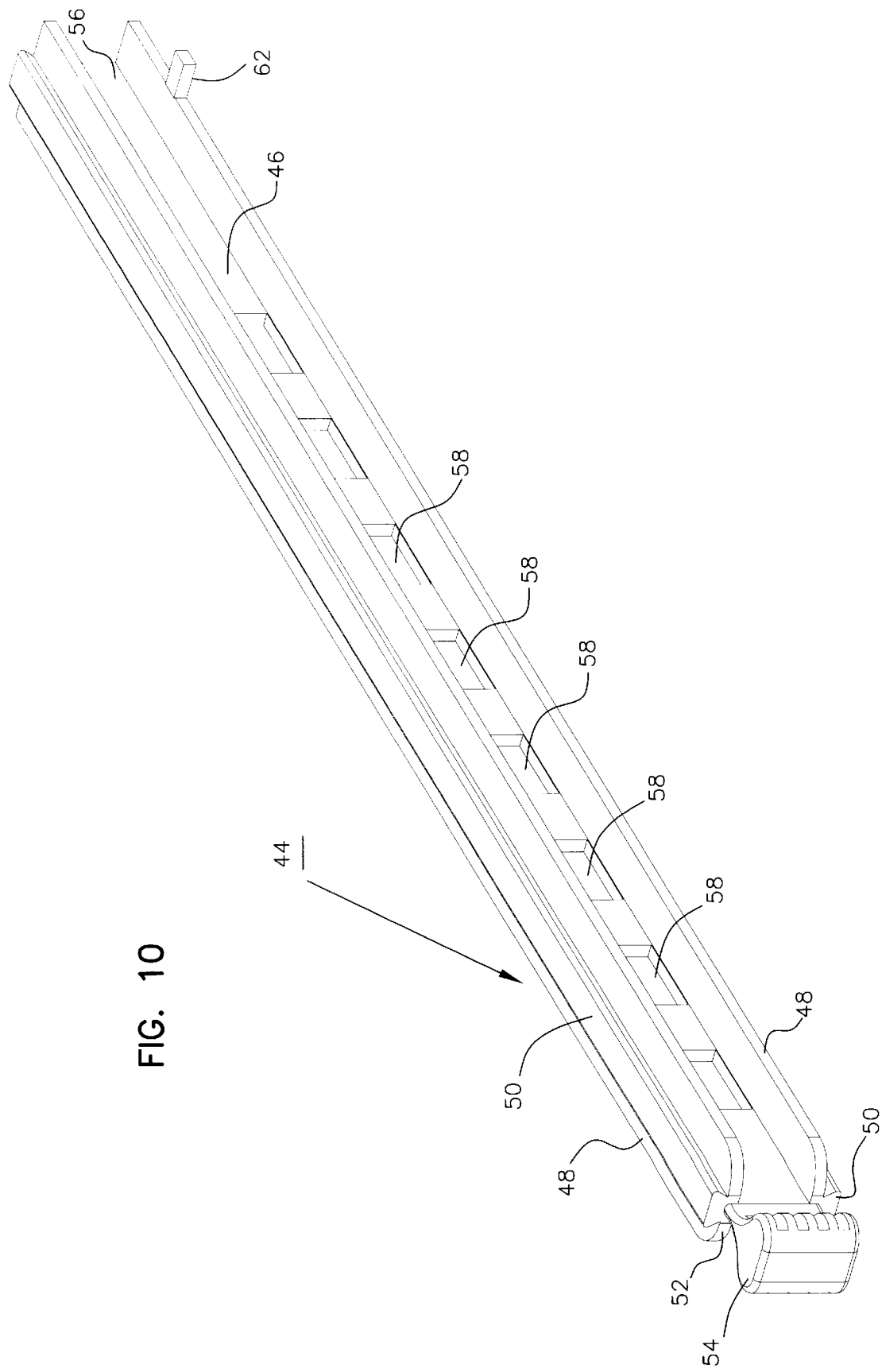
FIG. 10 is a perspective view of a support rod for use in the assembly of FIG. 5.
Figure 11:
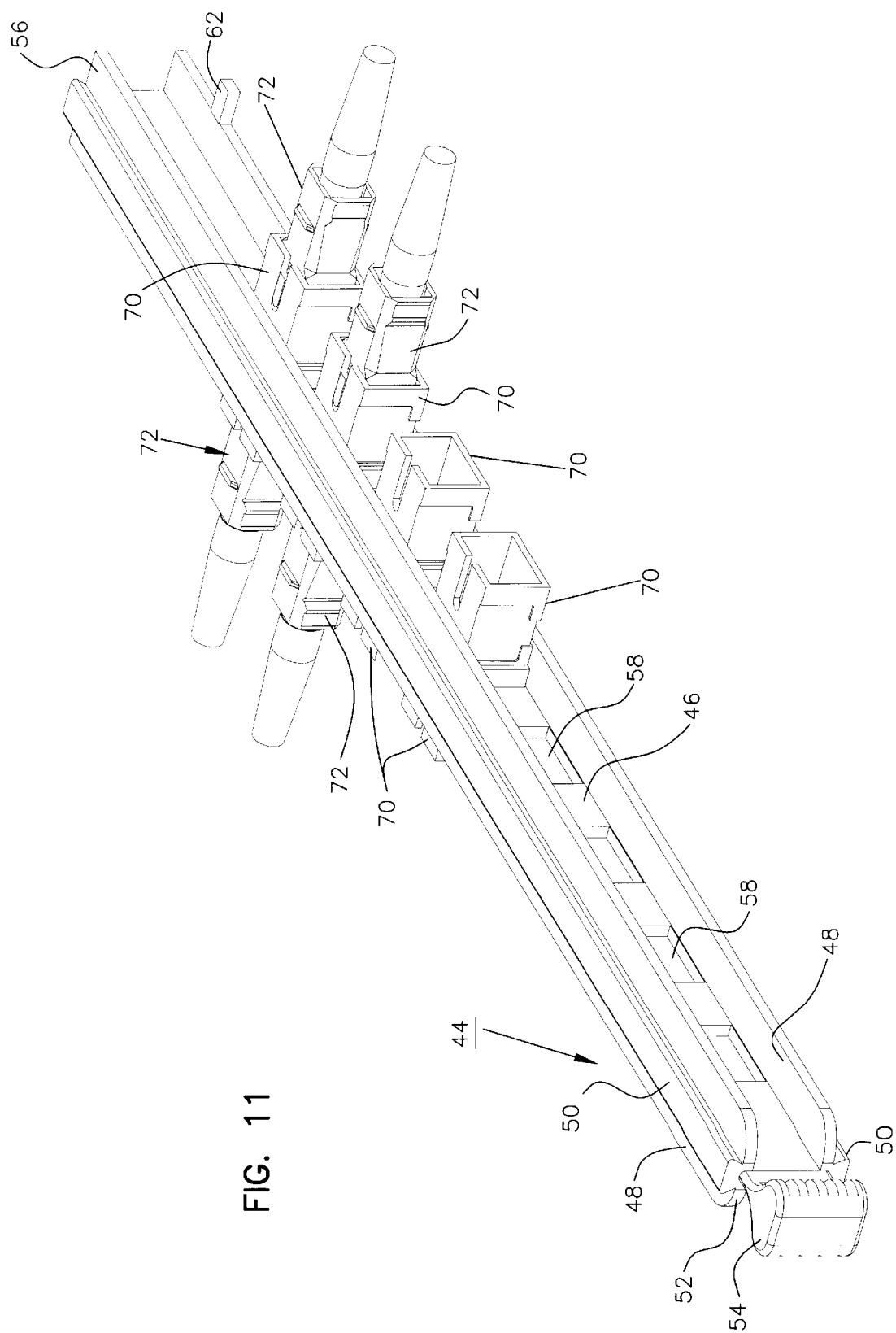
FIG. 11 is the view of FIG. 10 with fiberoptic adaptors shown coupled to the rod and with selected ones of the fiberoptic adaptors shown receiving fiberoptic connectors.

A front end 52 of the rod 44 is provided with a handle 54. In the retracted position of FIG. 5, a rear end 56 of the rod (shown only in FIGS. 6, 10 and 11) is adjacent the rear edge 38. With the rear end 56 so positioned, the handle 54 protrudes beyond the front forward edge 40 of the assembly 34 so that a technician may grasp the handle 54 without interference from the plates 36.

Figure 5:
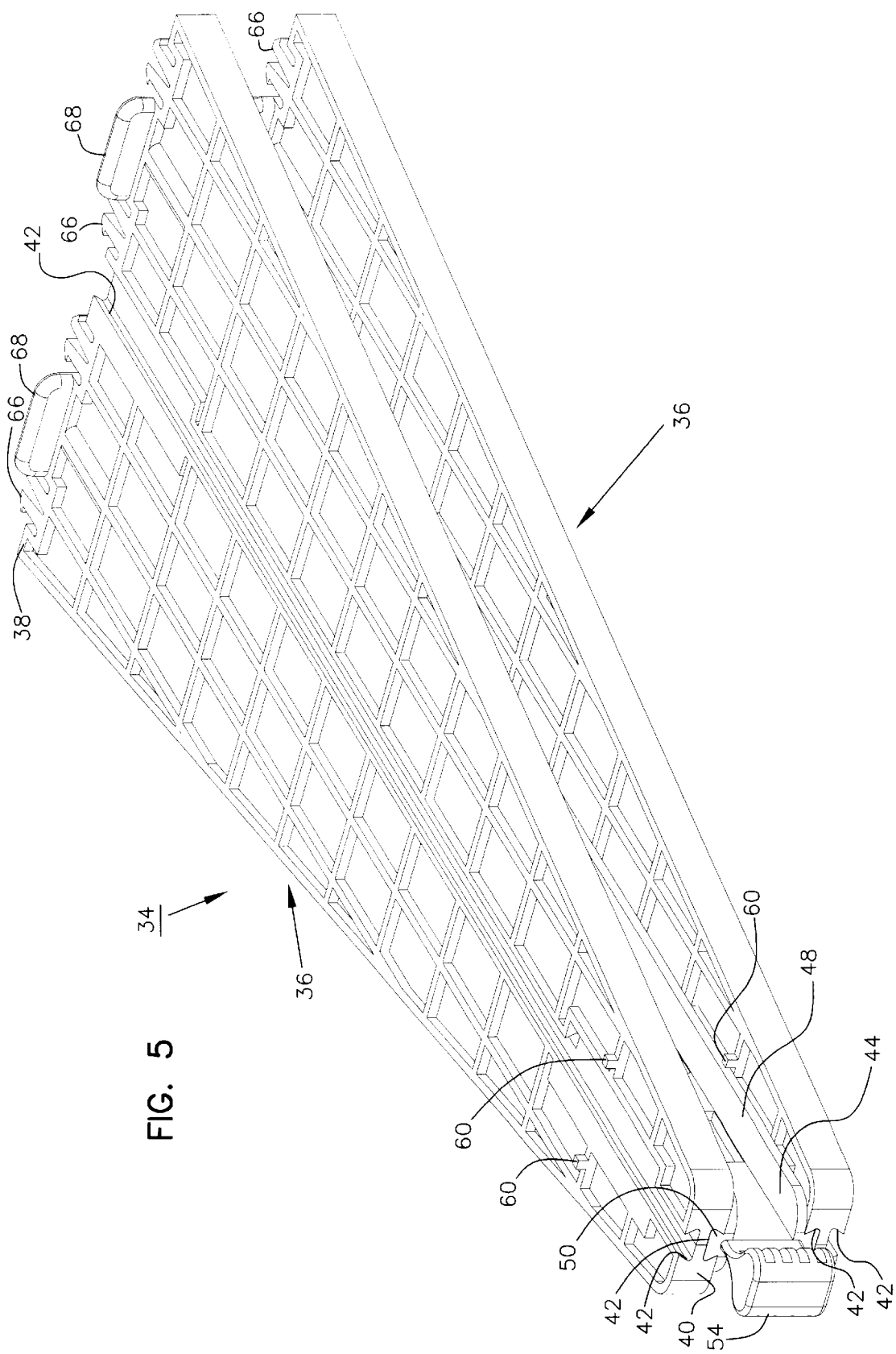
FIG. 5 is a front, top and right side perspective view of a bulkhead assembly for use in the fiber distribution frame of FIG. 1 and with a support rod shown in a retracted position.
Figure 6:
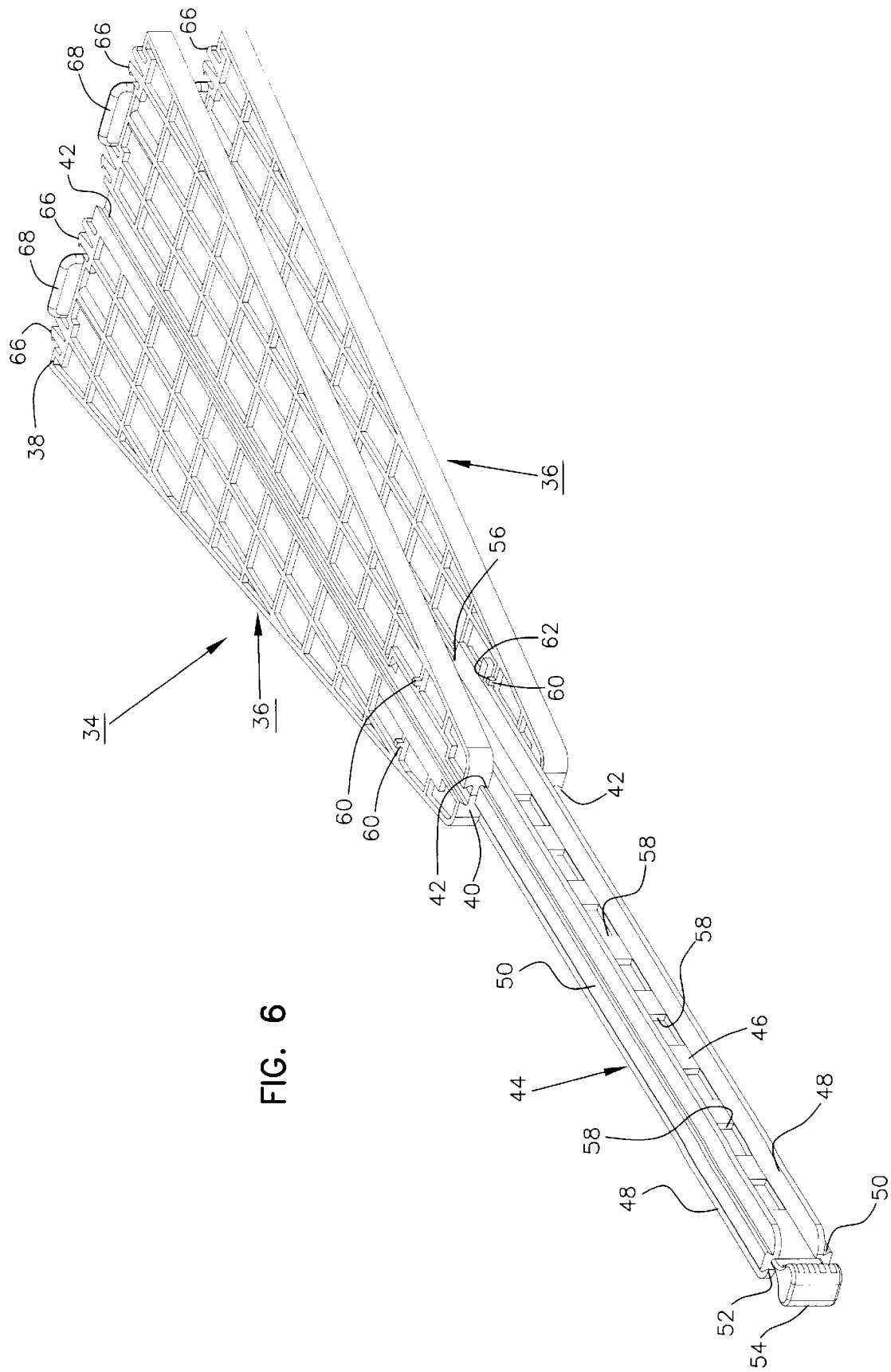
FIG. 6 is the view of FIG. 5 with a support rod shown in an extended position.

Opposite sides of the slide plates 36 are provided with protruding tabs 60 positioned opposite the end plates 48. As the rod 44 is slid between a retracted and extended position shown in FIGS. 5 and 6, the end plates 48 slide between the tabs 60. FIG. 5 shows the rod 44 in a retracted position, and FIG. 6 shows the rod 44 in a fully extended position. The rod 44 includes outwardly projecting stops 62 adjacent the rear end 56. The stops 62 are positioned to abut the tabs 60 when the rod 44 is in the fully extended position as shown in FIG. 6.

Figure 7:
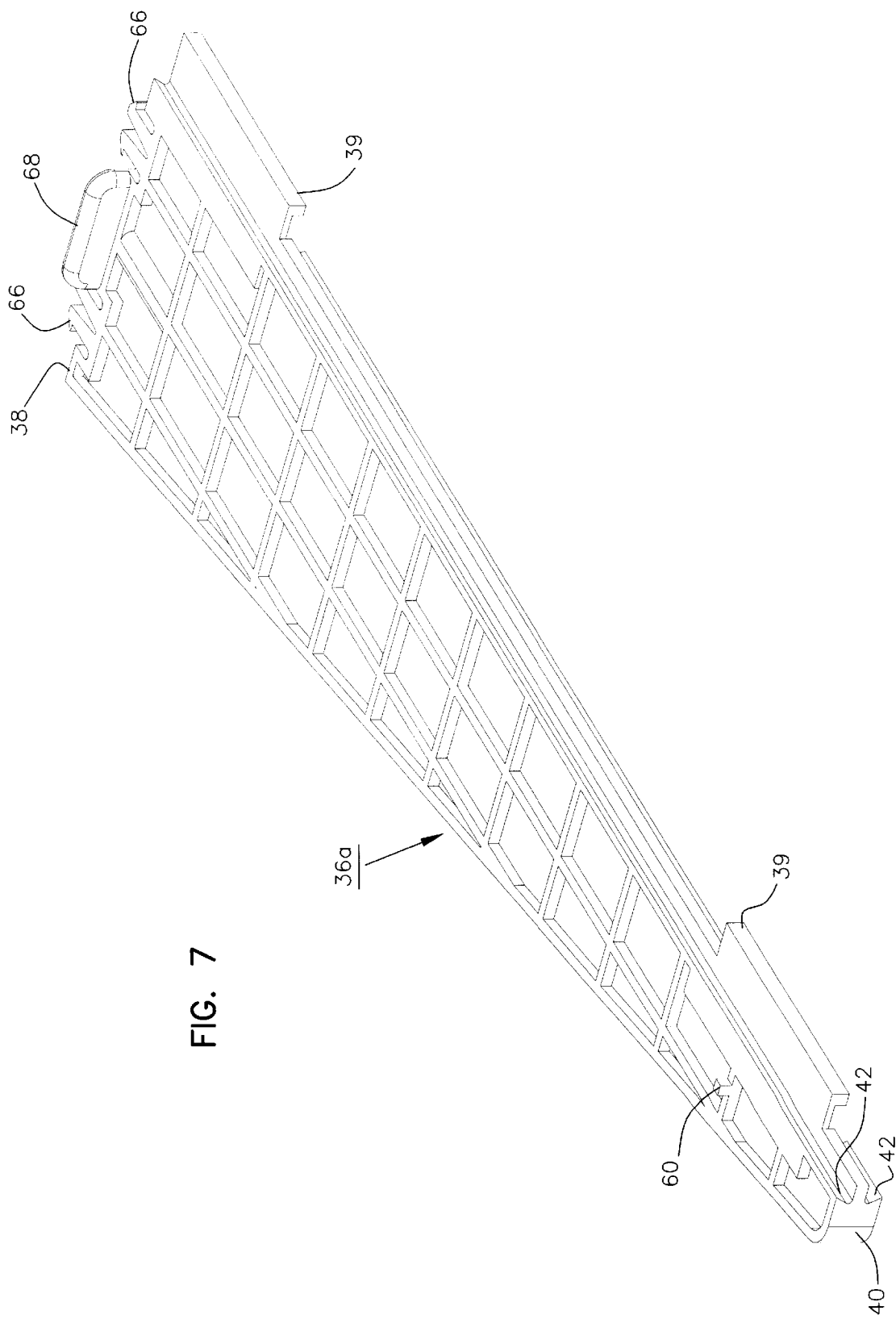
FIG. 7 is a perspective view of a slide plate segment for use in the assembly of FIG. 5.
Figure 8:
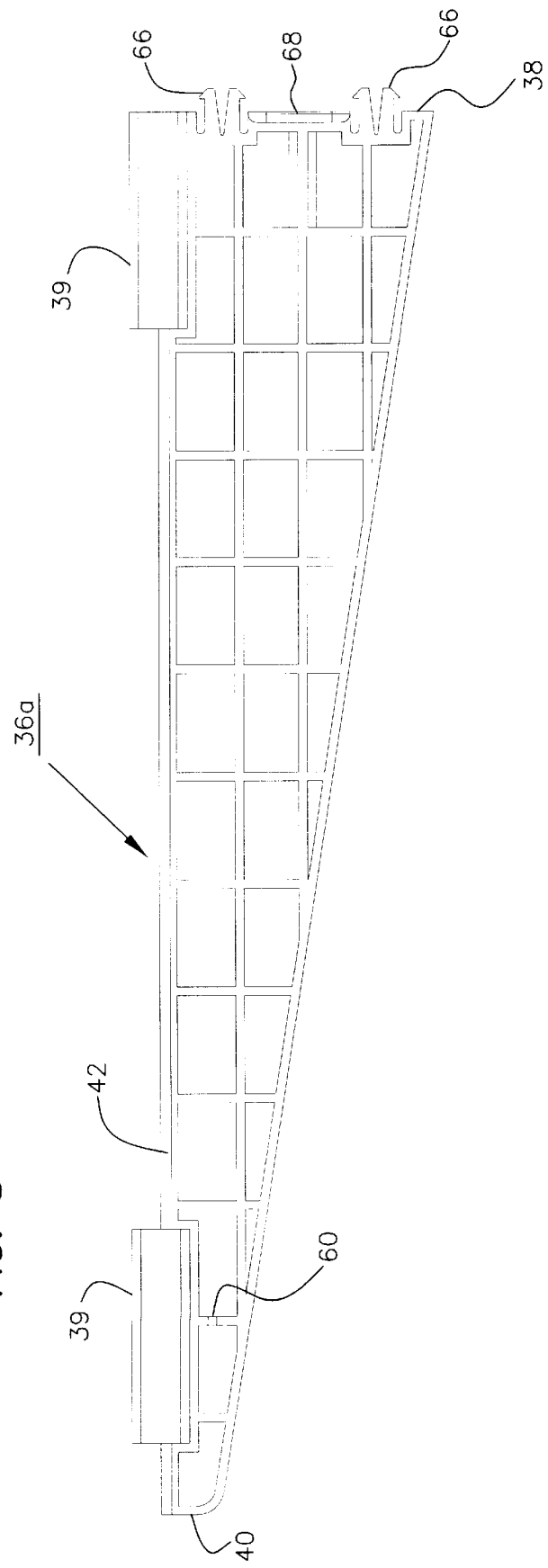
FIG. 8 is a bottom plan view of the slide plate segment of FIG. 7.
Figure 9:
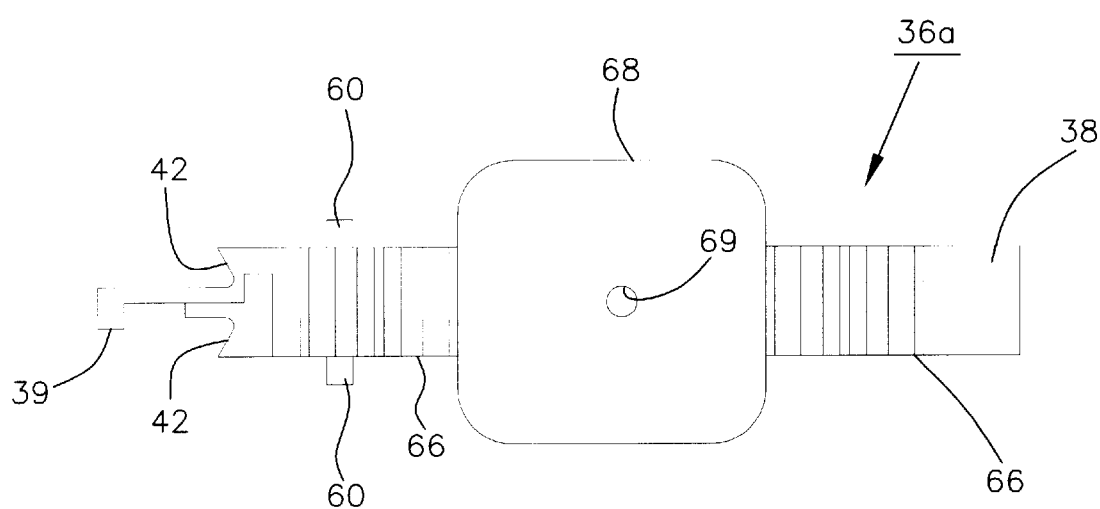
FIG. 9 is a rear elevation view of the slide plate segment of FIG. 7.

For ease of manufacture, the slide plates 36 are formed of a slide plate segment 36a shown separately in FIGS. 7–9. The plate segment 36a is preferably injection molded and is half of the width of the finished plate 36. The plate 36a includes locking tabs 39 such that when two plates 36a are positioned together (one flipped 180° relative to the other), the plates 36a may be joined together at the tabs 39 to form a completed plate 36. As a result, only one part 36a need be fabricated to form the upper and lower plates 36.

At the rear edge 38, the plates 36 have snap clips 66 and a vertical stop plate 68. The snap clips 66 are sized to be received within the square holes 33 of wall segment 32 and the plate 68 is sized to cover the hole 37. As a result, the slide plates 36 may be initially secured to the wall segment 32 by simply inserting the clips 66 into the holes 33 to initially secure the plates 36 to the wall segment 32. Screws 37a may be inserted through the back side of the wall 32 through the holes 37 and fastened into aligned holes 69 (see FIG. 9) in the vertical plate 68 to securely fasten the plates 36 to the wall segment 32.

As previously mentioned, a plurality of holes 58 are formed along the length of the rod 44. The holes 58 are linearly aligned with the path of travel in which the rod 44 moves when it moves between the extended and retracted position of FIGS. 5 and 6. Any number of holes can be provided, as desired.

A plurality of fiberoptic adaptors 70 are secured to the rod 44 by passing the adaptors 70 through the holes 58 and fastening the adaptors 70 to the rod 44 in any conventional manner. In the embodiment shown, well known SC adaptors 70 are shown connected to the rod 44. It will be appreciated that any type of adaptor can be secured to the rod 44.

SC adaptors are well known in the industry for receiving coupled pairs of SC connectors 72. The adaptors 70 are secured to the rod 44 in such an alignment that the connectors 72 extend perpendicular and transverse to the rod 44 on opposite sides of the central rib 46. Further, the axis of the connector 72 is parallel to and equally spaced between the slide plates 36. Unobstructed spacing between the slide plates 36 permits fiberoptic cables to pass unobstructed between the slide plates 36 and to move between the slide plates 36 as the rod 44 is moved between the extended and retracted position.

With the description thus provided, a bulkhead assembly 34 has been described which is easy to manufacture at low cost and which permits only a limited number of connectors 72 and adaptors 70 to be displaced in order to provide access to a given adaptor 70. Further, the invention is suitable to cable management which is desirable for a high density fiber distribution frame.

Figure 3:
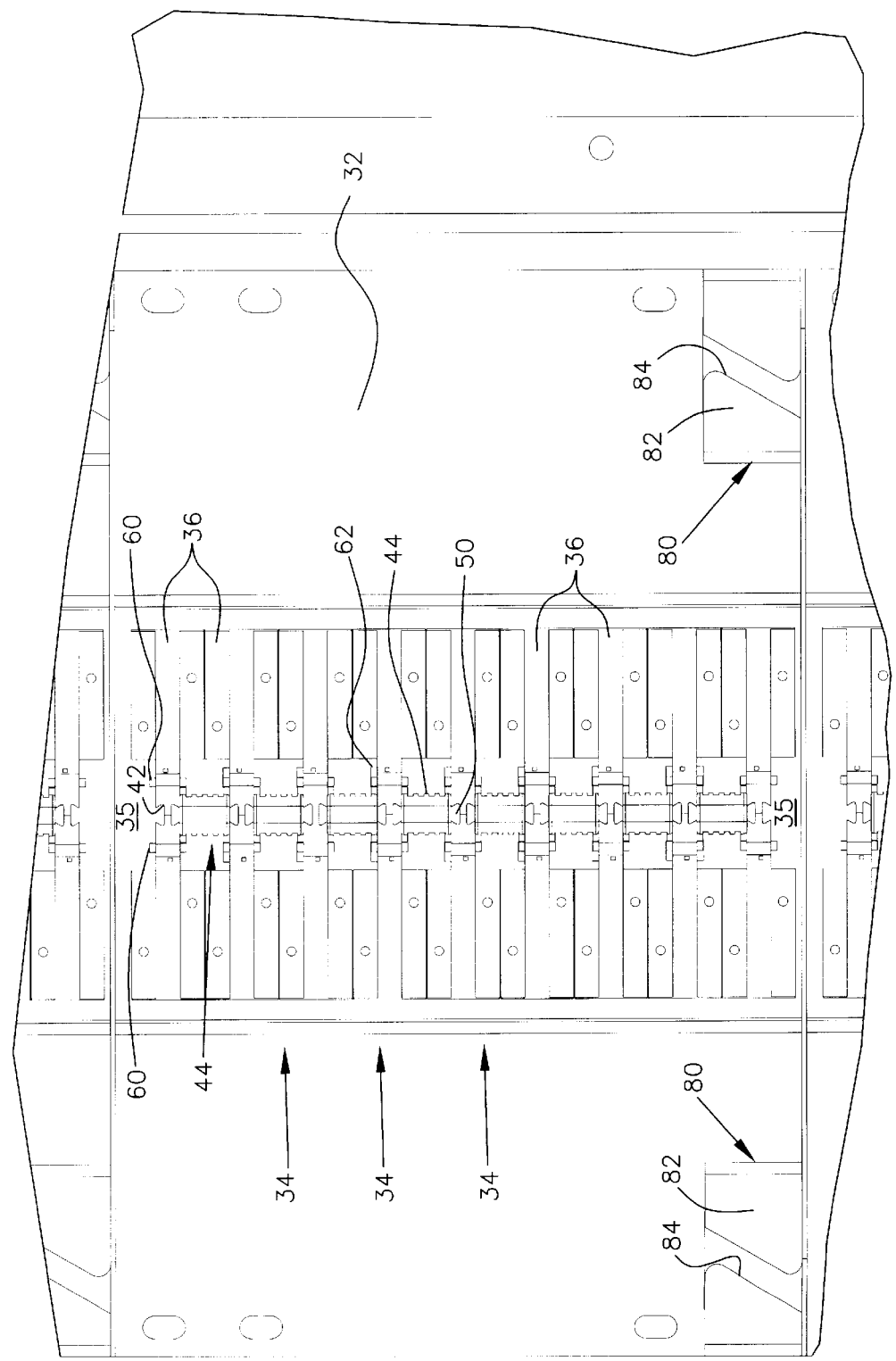
FIG. 3 is an enlarged front elevation view of a portion of the fiber distribution frame of FIG. 1.

As shown in FIG. 1, two vertical arrays of bulkhead assemblies 34 are provided. In the arrays, rods 44 share side plates 36 such that the upper side plate 36 of one assembly 34 is the lower side plate 36 of an adjacent assembly 34 as best illustrated in FIG. 3. The two vertical arrays of assemblies are further subdivided into individual groups which, in the embodiment shown, consist of eight rods 44 per group (requiring nine slide plates 36 per group). One group is fastened to one wall segment 32. A spacing 35 is provided between adjacent groups in an array.

Figure 2:
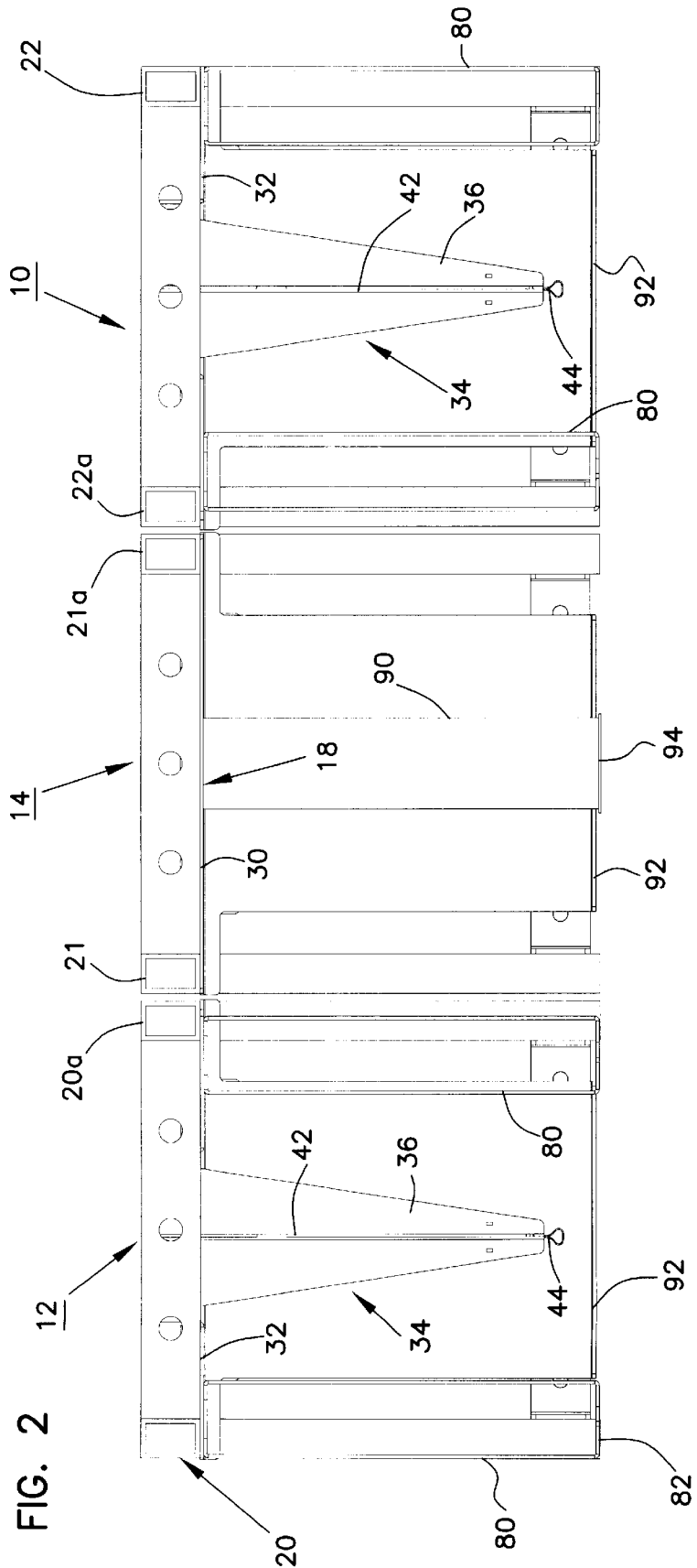
FIG. 2 is a top plan view of the fiber distribution frame of FIG. 1.

On opposite sides of the spacing 35 and aligned with the bottom of a group are fanning clips 80. The fanning clips 80 extend from the wall segments 32 a length slightly beyond the length of the assemblies 34 as illustrated in FIG. 2. As a result, as a rod 44 is moved to the fully extended position, cables from the sliding rod 44 remain in the clips 80 and are retained within the clips 80 without excessive bending. Forward edges 82 of the clips 80 are provided with slots 84 to permit easy insertion and removal of a cable.

The flat plate 30 between the vertical arrays of assemblies 34 includes a plurality of vertically aligned spools 90. Excess lengths of cables may be stored on the spools 90. The spools 90 are provided with enlarged face plates 94 to prevent a cable draped over a spool 90 from inadvertently sliding off the spool 90. The base 16 includes a horizontal trough 92 extending the transverse width of the frame 10 to permit cables to be passed from one vertical array of assemblies 34 to another vertical array of assemblies 34 or to be easily passed between aligned horizontal troughs 92 of adjacent frames 10.

Figure 12:
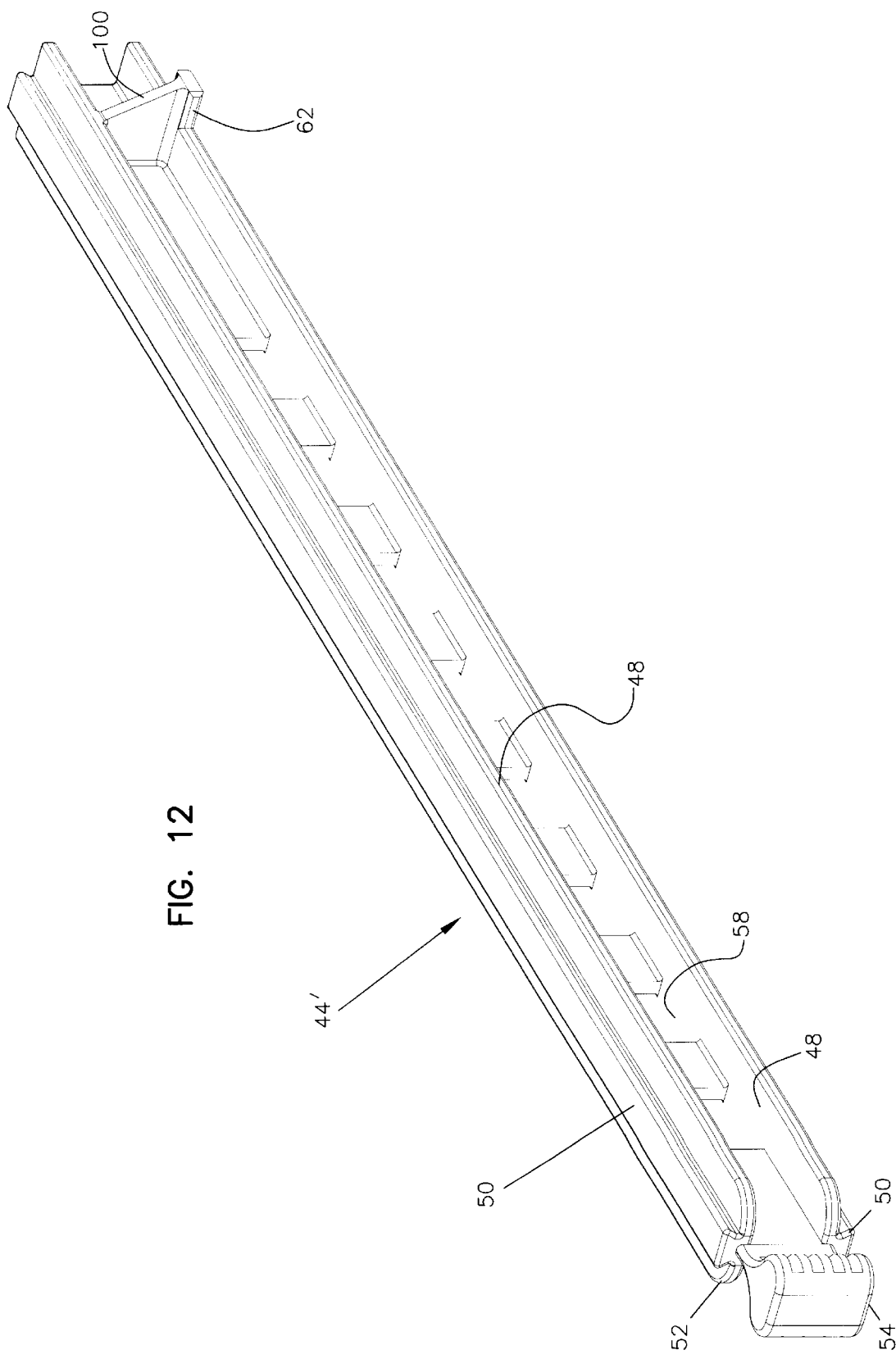
FIG. 12 is a perspective view of an alternative support rod for use in the assembly of FIG. 5.

Referring now to FIG. 12, an alternative rod 44' is shown. Rod 44' is constructed generally in a similar manner as rod 44 described above. Adjacent to stop 62 is a strengthening web 100 extending between end plates 48.

Figure 13:
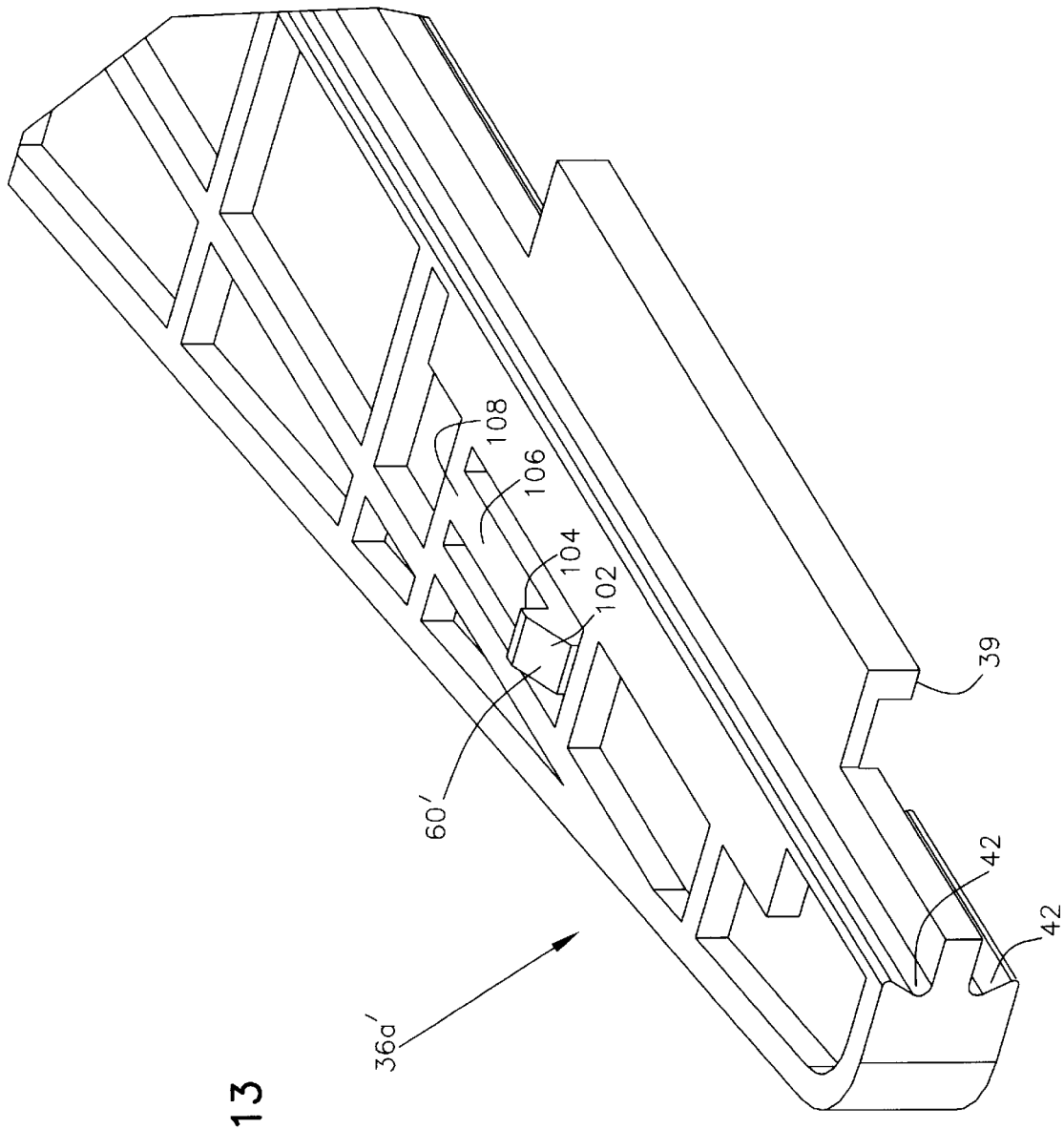
FIG. 13 is an enlarged perspective view of a portion of an alternative slide plate segment.

Referring now to FIG. 13, an alternative tab 60' is shown. Tab 60' includes a ramp surface 102, and a shoulder 104. A flexible parallel portion 106 extends between fixed portion 108, and ramp surface 102 and shoulder 104. Tab 60' flexes downwardly when a rod 44, 44' is inserted into a stack of assembled plates 36. Such a construction allows for rods 44, 44' to be added after assembly of plates 36 to support structure 12. Also, by providing the flexible tabs 60', rods 44, 44' can be removed by manually pulling tab 60' out of engagement with stop 62 at shoulder 104.

Figure 14:
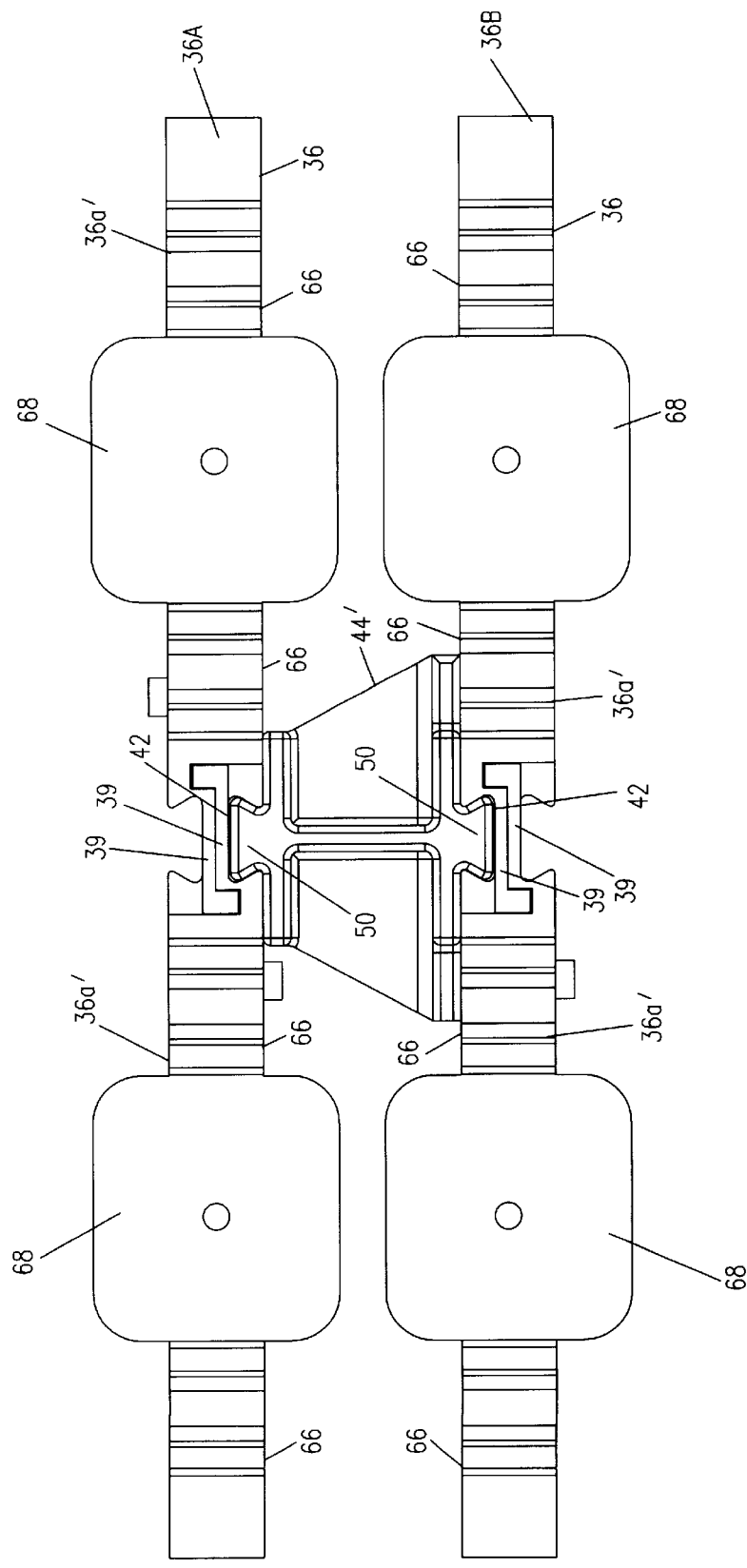

Referring now to FIG. 14, support plates 36 are shown with a rod 44' positioned there between for slideable relative movement. The dove-tail grooves 42 and the dove-tail rails 50 provide locking slideable engagement between support rod 44' and plates 36. As shown, upper plate 36A and lower plate 36B both engage rod 44'. FIG. 14 further illustrates the overlapping of locking tabs 39 adjacent to dove-tail grooves 42. For reason of manufacture, locking tabs 39 permit convenient locking of plate segments 36a', and also for a dove-tail groove to be provided in a molded construction. In the illustrated embodiments, dove-tail groove 42 is continuous except for at the region adjacent each locking tab 39. Slide plate 36 of FIGS. 1–3, and 5–9 is constructed and assembled in a similar manner.

With the invention thus described, the objects of the invention have been attained in the preferred manner. A high density fiber distribution frame is provided which is susceptible to low cost manufacture and ease of use and installation. Further, the invention permits organized management of the cables associated with the fiber distribution frame.

What is claimed is:

1. A fiber distribution frame comprising:
   a. a support structure having a vertical wall with a transverse dimension;
   b. a plurality of bulkhead assemblies each having:
      1. opposing and spaced-apart slide plates secured to said wall and extending substantially perpendicular to the wall from a rear edge adjacent the wall to a forward edge spaced from the wall;
      2. a connector support rod positioned between the slide plates and slidably connected to each of the slide plates for the rod to slide along a linear and horizontal path of travel extending substantially perpendicular to the transverse dimension of the wall, each plate extending on opposite sides of the rod;
      3. the rod slidable between a retracted position and an extended position, in the retracted position, a rear end of the rod positioned adjacent the rear edge of the slide plates and in the extended position, the rear end positioned adjacent the forward edge of the slide plates;
      4. the rod carrying a plurality of fiber optic adaptors each for receiving an individual coupled pair of fiber optic connectors, the plurality of adaptors disposed on the rod in a linear array extending along the path of travel and with the adaptors aligned for coupled connectors to extend transversely away from the path of travel on opposite sides of the rod;
      5. wherein the plates are spaced apart to define an unobstructed spacing between the plates on opposite sides of the rod along the length of the plates between the rear and forward edges;
      6. a vertical lock slide between the rod and the plates wherein the rod is slideable only in the horizontal direction, and wherein the rod is locked to the plates in the vertical direction;
   c. wherein the plurality of assemblies are disposed in a vertical array with an upper of the plates of an assembly concurrently being a lower one of the plates of an adjacent assembly.

2. A fiber distribution frame according to claim 1, wherein the plates are triangularly shaped, and the rod is positioned to generally bisect the triangular shape.

3. A fiber distribution frame according to claim 1, wherein the assemblies are grouped into multiple groups of multiple assemblies with a gap between groups.

4. A fiber distribution frame according to claim 3, further comprising fanning clips aligned with the gaps between groups.

5. A fiber distribution frame according to claim 1, further comprising two transversely spaced, vertical arrays of the assemblies.

6. A fiber distribution frame according to claim 5 comprising a field of cable storage members disposed between the two vertical arrays of the assemblies.

7. A fiber distribution frame according to claim 1, wherein the rod includes upper and lower dove-tail rails, and wherein the respective upper and lower plates each include a dove-tail groove, wherein the dove-tail rails and the dove-tail grooves define the vertical lock slide.

8. A fiber distribution frame according to claim 7, wherein each plate includes two separate slide plate segments, each segment including a locking tab engageable with the other segment, each segment forming a portion of the dove-tail groove.

9. A fiber distribution frame according to claim 8, wherein each slide plate segment of each plate is identical to the other segment of the respective plate.

10. A fiber distribution frame according to claim 9, further comprising a stop extending from the rod adjacent to the rear end, each slide plate segment including a tab adjacent to the forward edge and engageable with the stop so as to define the extended position, each slide plate segment including a snap clip, and a fastener receiving vertical plate, the vertical plate including a hole for receiving a fastener, the support structure including a first opening receiving the snap clip, and a second opening for receiving the fastener, and further comprising a fastener positioned in the hole of the vertical plate and the second opening of the support structure.

11. A fiber distribution frame according to claim 10, wherein the tab includes a ramped surface facing the forward edge, wherein the tab further includes a flexible portion extending generally parallel to a plane defined by the plate.

12. A fiber distribution frame according to claim 1, further comprising a stop extending from the rod adjacent to the rear end, the plate including a tab adjacent to the forward edge and engageable with the stop so as to define the extended position.

13. A fiber distribution frame according to claim 12, wherein the tab includes a ramped surface facing the forward edge, wherein the tab further includes a flexible portion extending generally parallel to a plane defined by the plate.

14. A fiber distribution frame according to claim 1, wherein the rear edge of the plate includes a snap clip, and a fastener receiving vertical plate, the vertical plate including a hole for receiving a fastener, the support structure including a first opening receiving the snap clip, and a second opening for receiving the fastener, and further comprising a fastener positioned in the hole of the vertical plate and the second opening of the support structure.

15. A fiber distribution frame comprising:
 a. a support structure having a vertical wall with a transverse dimension;
 b. a plurality of bulkhead assemblies each having:
  1. opposing and spaced-apart slide plates secured to said wall and extending substantially perpendicular to the wall from a rear edge adjacent the wall to a forward edge spaced from the wall;
  2. a connector support rod positioned between the slide plates and slidably connected to each of the slide plates for the rod to slide along a linear and horizontal path of travel extending substantially perpendicular to the transverse dimension of the wall, each plate extending on opposite sides of the rod;
  3. the rod slidable between a retracted position and an extended position, in the retracted position, a rear end of the rod positioned adjacent the rear edge of the slide plates and in the extended position, the rear end positioned adjacent the forward edge of the slide plates;
  4. the rod having a plurality of apertures, each sized to carry a fiber optic adaptor for receiving an individual coupled pair of fiber optic connectors, the plurality of apertures disposed on the rod in a linear array extending along the path of travel for receipt of the adaptors aligned for coupled connectors to extend transversely away from the path of travel on opposite sides of the rod;
  5. wherein the plates are spaced apart to define an unobstructed spacing between the plates on opposite sides of the rod along the length of the plates between the rear and forward edges;
  6. a vertical lock slide between the rod and the plates wherein the rod is slideable only in the horizontal direction, and wherein the rod is locked to the plates in the vertical direction;
 c. wherein the plurality of assemblies are disposed in a vertical array with an upper of the plates of an assembly concurrently being a lower one of the plates of an adjacent assembly.

16. A fiber distribution frame according to claim 15, wherein the plates are triangularly shaped, and the rod is positioned to generally bisect the triangular shape.

17. A fiber distribution frame according to claim 16, wherein the assemblies are grouped into multiple groups of multiple assemblies with a gap between groups.

18. A fiber distribution frame according to claim 17, wherein the rod includes upper and lower dove-tail rails, and wherein the respective upper and lower plates each include a dove-tail groove, wherein the dove-tail rails and the dove-tail grooves define the vertical lock slide.

19. A fiber distribution frame according to claim 18, wherein each plate includes two separate slide plate segments, each segment including a locking tab engageable with the other segment, each segment forming a portion of the dove-tail groove.

20. A fiber distribution frame according to claim 19, wherein each slide plate segment of each plate is identical to the other segment of the respective plate.

21. A fiber distribution frame according to claim 15, further comprising a stop extending from the rod adjacent to the rear end, the plate including a tab adjacent to the forward edge and engageable with the stop so as to define the extended position.

22. A fiber distribution frame according to claim 21, wherein the tab includes a ramped surface facing the forward edge, wherein the tab further includes a flexible portion extending generally parallel to a plane defined by the plate.

23. A fiber distribution frame according to claim 15, wherein the rear edge of the plate includes a snap clip, and a fastener receiving vertical plate, the vertical plate including a hole for receiving a fastener, the support structure including a first opening receiving the snap clip, and a second opening for receiving the fastener, and further comprising a fastener positioned in the hole of the vertical plate and the second opening of the support structure.

* * * * *

UNITED STATES PATENT AND TRADEMARK OFFICE
CERTIFICATE OF CORRECTION

PATENT NO.      : 6,201,919 B1
DATED           : March 13, 2001
INVENTOR(S)     : Puetz et al.

It is certified that error appears in the above-identified patent and that said Letters Patent is hereby corrected as shown below:

<u>Title page,</u>
Item [56], References Cited, OTHER PUBLICATIONS, please insert the following references that were not listed:

-- Exhibit A    Northern Telecom brochure entitled "product information bulletin," 16 pages, dated May, 1991 --

-- Exhibit B    AT&T brochure entitled "High Density Interconnect System (HDIC)," 4 pages, copyright 1989 --

Signed and Sealed this

Ninth Day of July, 2002

*Attest:*

JAMES E. ROGAN
*Attesting Officer*     Director of the United States Patent and Trademark Office